Figure 1:
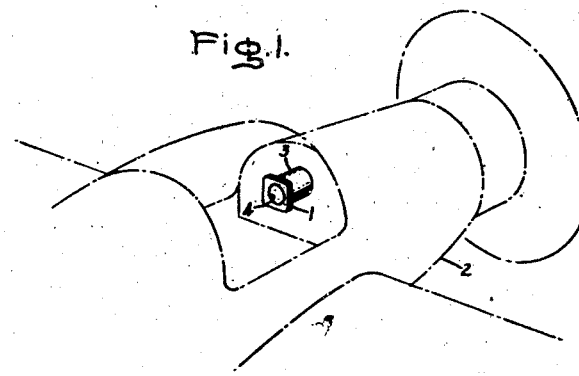

March 18, 1947.   H. C. WENDT   2,417,720
GYROSCOPIC ATTITUDE INDICATOR
Filed April 3, 1945   2 Sheets-Sheet Inventor:
Harry C. Wendt,
by Harry E. Dunham
His Attorney.

March 18, 1947.  H. C. WENDT  2,417,720
GYROSCOPIC ATTITUDE INDICATOR
Filed April 3, 1945  2 Sheets-Sheet 2

Climb and Right Bank

Dive and Left Bank

Receiver  Transmitter

Inventor:
Harry C. Wendt,
by Harry E. Dunham
His Attorney.

Patented Mar. 18, 1947

2,417,720

UNITED STATES PATENT OFFICE 2,417,720

GYROSCOPIC ATTITUDE INDICATOR

Harry C. Wendt, Nahant, Mass., assignor to General Electric Company, a corporation of New York Application April 3, 1945, Serial No. 586,340

1 Claim. (Cl. 33—204)

The present invention relates to position-indicating instruments, and more particularly to instruments used for indicating the position or attitude of an airplane in flight, usually referred to as artificial horizons.

The conventional artificial horizon attitude-indicating instruments, which are usually gyroscopically actuated, are provided with a horizon bar which moves up and down and banks to the right or left in response to changes in pitch and bank attitude of the aircraft on which the instrument is being used. The pilot observes the movements of the horizon bar against a stationary reference which is usually in the form of a miniature airplane, and thereby determines the pitch and bank attitude of the aircraft. A difficulty encountered with these instruments is that they are apt to produce a wrong reaction in the pilot who is controlling the airplane in response to indications of the instrument. Thus, for example, when the aircraft dives, the horizon bar moves up and the natural reaction is apt to be to lower the nose of the airplane to lower the bar, whereas the nose should be raised to lower the bar. Similarly, when the airplane banks, say to the right, the horizon bar banks to the left and the natural reaction is apt to be to apply right bank control to level the horizon bar, whereas left bank control should be applied.

It has been recognized heretofore that it would be desirable to build an attitude-indicating instrument provided with an indicator which would move relative to a fixed horizon line on the instrument in the same sense that the aircraft on which the instrument is mounted moves relative to the natural horizon. Previous attempts along this line, with which I am familiar, have not been very successful because of the fact that in order to obtain motion of the indicator in the proper sense relative to the fixed horizon line, special motion-reversing linkages or gearing have been required which not only considerably complicate the instrument but also introduce additional friction which is apt to disturb the gyroscope and thereby cause an erroneous indication.

It is an object of the present invention to provide a new and improved attitude-indicating instrument for aircraft of the type in which an indicator moves relative to a horizon reference fixed to the instrument in the same sense that the aircraft on which the instrument is mounted moves relative to the natural horizon.

A further object of the invention is to provide an attitude-indicating instrument of the type set forth in the preceding paragraph which is simple, inexpensive and which does not introduce additional friction likely to disturb the gyroscope or other position-maintaining means used to measure the attitude of the aircraft relative to the vertical.

Other objects and advantages of the present invention will become apparent as the following description proceeds.

Briefly, in accordance with the preferred illustrated embodiment of my invention, a vertical spin axis gyroscope is used to measure the pitch and bank attitudes of the aircraft relative to the vertical. A rotatable indicator, preferably in the form of a miniature airplane, is mounted on a support which is connected to a gyroscope so as to be stabilized thereby. During changes in pitch attitude, the indicator appears to move vertically with reference to a horizon reference line fixed to the case thereby giving an indication of pitch attitude in the desired sense. In order to obtain bank indication, the indicator is rotated by the receiver unit of an electrical angular position-transmitting system, the transmitter unit of which is driven by movements of the gyroscope relative to the case about the roll axis. With this arrangement no gearing is required and the correct sense of rotation of the indicator is obtained simply by properly selecting the electrical connections between the transmitter and receiver units.

Figure 2:
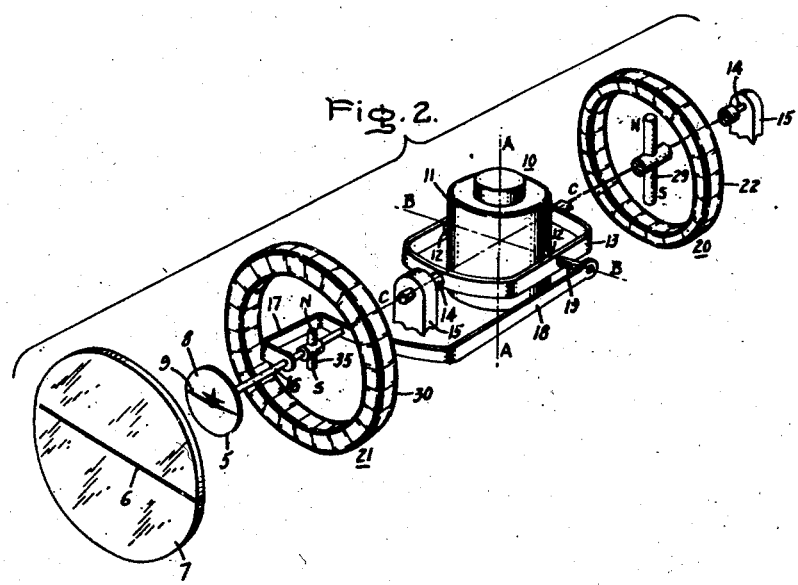
Figure 3:
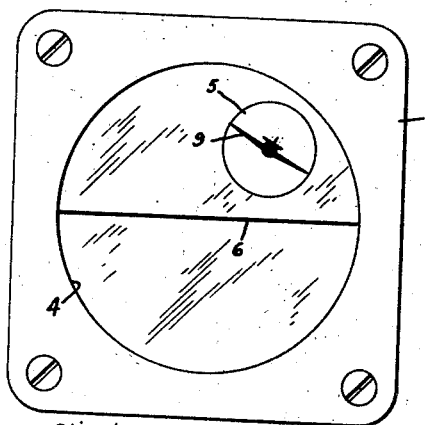
Figure 4:
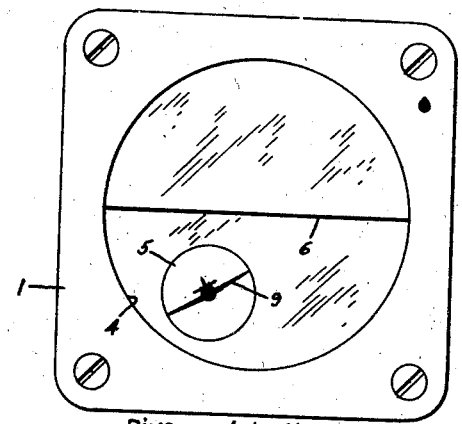
Figure 5:
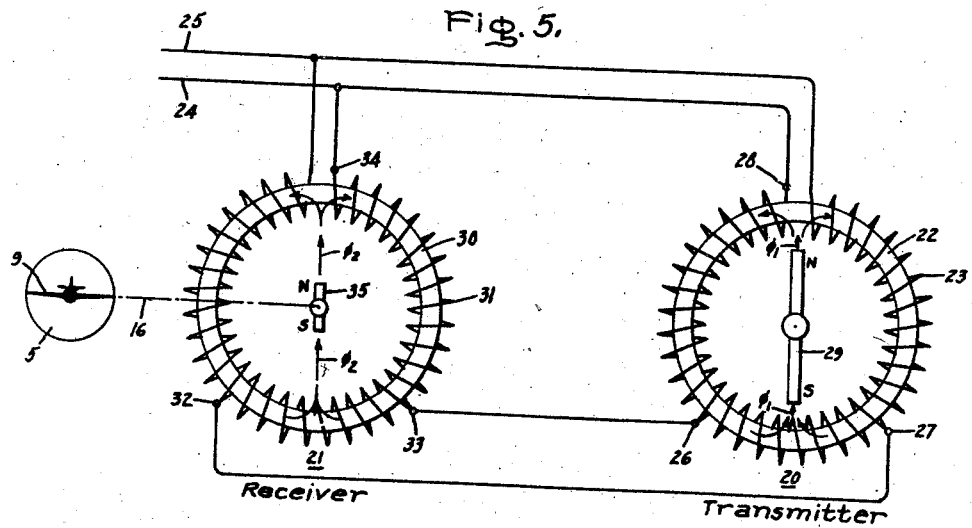

For a better and more complete understanding of the present invention, reference should now be made to the following detailed description and to the accompanying drawings in which Fig. 1 is an external perspective view of the aircraft attitude indicating instrument forming the subject matter of the present invention, the instrument being shown as mounted on an aircraft; Fig. 2 is a perspective internal view of the instrument showing certain details of the construction; Fig. 3 is a front view of the instrument showing the position of the indicator when the aircraft is in a climb and right bank; Fig. 4 is a front view of the instrument showing the position of the indicator when the aircraft is in a dive and left bank; and Fig. 5 shows the electrical connections of the transmitter and receiver units used to transmit the roll indications from the gyroscope to the rotatable indicator.

Referring to the drawing, I have shown as a preferred embodiment of my invention an aircraft attitude indicating instrument comprising a rectangular face plate 1 which may be mounted on the control panel of an aircraft 2 so that it faces rearwardly towards the pilot who is controlling the aircraft. The mechanism of the instrument is housed in a cylindrical casing 3 which extends behind the control panel. The face plate 1 is provided with a circular opening or window 4 through which the pilot observes the movements of an indicator 5 to determine pitch and bank attitudes of the aircraft. Movements of the indicator 5 are observed with reference to a fixed horizon reference line 6 which may be, as shown, painted or otherwise marked on a cover glass 7 which fits over the opening or window 4.

While the indicator 5 may have any suitable form, I prefer to use an indicator which is shaped or painted to represent the silhouette of a miniature airplane as viewed from the rear in order to convey to the pilot the impression that he is observing the movement of his own aircraft from a stabilized platform in the rear. In the illustrated arrangement, the indicator 5 is shown as comprising a thin disk 8 on which is painted a silhouette 9 of a miniature airplane as viewed from the rear. Indicators having other shapes or configurations may be used without departing from my invention.

For the purpose of measuring the pitch and bank attitudes of the aircraft relative to the vertical, there is provided a vertical axis gyroscope indicated generally at 10. The gyroscope, which may be of conventional construction, comprises a rotating element driven by any suitable motor means not shown. The rotating element of the gyroscope and the motor drive means are enclosed in a housing indicated at 11, the housing being oriented so that the spin axis of the gyroscope extends in the direction of the axis AA which is approximately vertical. The housing 11 is provided with trunnions 12 which are journaled in a gimbal member 13 so that the housing is free to rotate about an axis BB which extends in the direction of the athwartship axis of the aircraft, and lies at right angles to the gyro spin axis AA. The axis BB may be termed the pitch axis of the gyroscope.

The gimbal member 13 is provided with trunnions 14 which are journaled in stationary supports 15 so as to permit rotation of the gimbal and gyroscope about an axis CC which extends in the direction of the longitudinal axis of the aircraft. The axis CC is perpendicular to the axis BB, and may be termed the roll axis of the gyroscope. The mounting arrangement for the gyroscope, which is a conventional Cardan suspension, permits universal movement of the instrument relative to the gyroscope and due to the characteristic gyroscopic property of rigidity the spin axis AA of the gyroscope tends to stay vertical. To keep the spin axis of the gyroscope in a vertical direction, a conventional pendulous erection system (not shown) may be provided. As will be understood by those skilled in the art, the pitch attitude of the aircraft may be measured by the angular position of the trunnion shaft 12 relative to the gimbal 13, and the bank attitude of the aircraft may be measured by the angular position of the trunnion shaft 14 relative to the fixed supports 15.

The indicator 5 is attached to a shaft 16 which is rotatably supported or journaled on the U-shaped end portion 17 of a supporting member or lever 18. The other end of the member 18 is rigidly connected to the gyroscope housing 11 by means of a shaft 19, which may, as shown, constitute an extension of one of the trunnions 12 which passes through the gimbal member 13. Since the indicator 5 is connected to the gyroscope housing 11, it is stabilized in space with reference to movements of the aircraft and the instrument case. Therefore, as the pitch attitude of the aircraft changes by angular motion relative to the pitch axis BB, the horizon reference line 6 moves up and down relative to the indicator 5. Since the pilot moves with the instrument case, this creates an illusion that the indicator 5 is moving vertically with reference to the horizon line 6 and by observing the position of the indicator 5 relative to the horizon line 6, the pilot can determine whether or not the airplane is a climbing or diving attitude. It will be noted that when the aircraft climbs, the horizon line 6 moves downwardly so that the indicator 5 appears to move upwardly from the horizon line. On the other hand, when the aircraft dives, the horizon line 6 moves upwardly so that the indicator 5 appears to move below the horizon line. This gives the desired sense of indication in that the indicator moves relative to the horizon line in the same sense that the aircraft moves relative to the natural horizon as viewed from the rear.

In order to provide means for rotating the indicator 5 in accordance with the angle of bank of the aircraft as measured by the gyroscope 10, I provide an electric angular position-transmitting system comprising a transmitter unit indicated generally at 20, and a receiver unit indicated generally at 21. The electric angular position-transmitting system illustrated is of the so-called second harmonic type, and as shown in detail in Fig. 5, the transmitter unit 20 comprises an annular stator core 22 of permeable magnetic material such as, for example, magnetic material known to the trade as "Permalloy" or "Mumetal." The core 22 carries a uniformly distributed winding 23, the terminals of which are connected to alternating current supply leads 24 and 25. The winding 23 is also provided with three equally spaced tap connections 26, 27 and 28 which may be termed polyphase connections. The rotor of the transmitter unit 20 comprises a poled permanent magnet 29 which, as shown in Fig. 2, is mounted on the longitudinal trunnion shaft 14 of the gyroscope 10.

The receiver unit 21 is similar to the transmitter unit 20 and comprises an annular core 30 formed of permeable magnetic material which carries a uniformly distributed winding 31, the end connections of which are connected to the alternating current supply leads 24, 25 as shown. The winding 31 is provided with three tap connections 32, 33 and 34, which are equally spaced and which correspond to the connections 26, 27 and 28 of the transmitter 20. The rotor of the receiver unit comprises a poled permanent magnet 35 which, as shown in Fig. 2, is mounted on the shaft 16 which carries the rotatable indicator 5. The polyphase connections 26, 27 and 28 of the transmitter unit and the polyphase connections 32, 33 and 34 of the receiver unit are electrically connected as shown, the connections being such that the desired relative rotations of the rotors of the transmitter and receiver units are obtained as will be more fully described. It will be well understood by those skilled in the art that the magnetic flux $\phi_1$ produced by the rotor magnet 29 of the transmitter unit flows through the core 22 and causes second harmonic currents to be induced in the winding 23. Due to the interconnection of the polyphase connections of the transmitter and receiver units, corresponding second harmonic currents are induced in the winding 31 which in turn cause a leakage unidirectional magnetic flux $\phi_2$ to flow across the diameter of the core 30 as indicated. The rotor magnet 35 of the receiver unit being free to rotate, aligns itself with the unidirectional magnetic flux $\phi_2$. When the magnet 29 of the transmitter unit rotates relative to the stator, the magnetic flux $\phi_2$ rotates correspondingly and in this manner angular movement of the transmitter unit is transmitted to the receiver unit.

The stator core 22 of the transmitter unit and the stator core 30 of the receiver unit are both attached to the instrument case by means not shown, the core 22 being located so that it surrounds the rotor magnet 29 and the core 30 being located so that it surrounds the rotor magnet 35. Sufficient clearance is allowed between the rotor magnet 35 and the stator core 30 of the receiver unit so that the indicator 5 and its support 18 are free to move sufficiently to give the pitch indicating movement of the indicator as described above.

When the aircraft and the instrument case bank, say to the right, by rotating clockwise about the roll axis CC, the stators 22 and 30 of the transmitter and receiver units and also the horizon reference line 6 rotate clockwise an amount equal to the angle of bank $\theta$. The rotor magnet 29 of the transmitter unit being connected to the gyroscope 10 is stabilized against rotation about the axis CC and therefore the stator and rotor of the transmitter unit are displaced by the angle $\theta$. This causes the flux $\phi_2$ in the receiver unit to be displaced relative to the stator 30 by a corresponding angle $\theta$ which in turn causes the receiver rotor magnet 35 and the attached indicator 5 to also rotate through the angle $\theta$ relative to the stator 30. By properly selecting the electrical connections between the stator windings of the transmitter and receiver units, the rotation of the indicator 5 relative to the horizon line 6 is obtained in the desired direction. Thus, for the condition of right bank assumed, the indicator 5 rotates clockwise relative to the horizon line 6 by an amount equal to the angle of bank $\theta$. With reference to the transmitter and receiver units 20 and 21 as viewed in Fig. 2 and in Fig. 5, the electrical connections between the transmitter and receiver stator windings are such that a counterclockwise movement of the transmitter magnet 29 relative to its associated stator 22 causes a clockwise movement of the receiver magnet 35 relative to its associated stator 30 and vice versa. The correct indication of the indicator 5 requires a motion reversal with reference to gyroscope position and this is accomplished electrically. In Fig. 5 the reversal is indicated by reversal of the connections between taps 26 and 27 of the transmitter stator winding and taps 32 and 33 of the receiver stator winding. It will be evident, however, that an equivalent reversal can be accomplished by mechanically reversing the relative position of the transmitter or receiver unit. It is to be noted that in measuring the angle of rotation of the indicator 5 with reference to the vertical spin axis of the gyroscope 10, the indicator rotates through an angle $\theta$ due to the mechanical rotation of the stator 30 of the receiver unit with the instrument case and rotates through an additional angle $\theta$ due to the displacement between the rotor and stator of the transmitter unit so that the indicator 5 actually rotates through an angle equal to $2\theta$ relative to the vertical. However, since the horizon reference line 6 also rotates through the angle $\theta$, the relative angular rotation between the indicator 5 and the horizon reference line 6 equals the angle of bank $\theta$, which is the desired condition.

If the aircraft and instrument case bank to the left, the reverse of the above-described operation will take place so that the indicator 5 banks to the left relative to the horizon line 6 as will be clearly evident from the foregoing.

It is believed that the operation of my improved attitude indicating instruments will now be clear. When the aircraft is flying straight and level, the indicator 5 is in the center of the window 4, the wing of the miniature airplane 9 lying in coincidence with the horizon line 6. If the aircraft assumes a climbing attitude, the miniature airplane 9 moves above the horizon line 6 indicating the climb. If simultaneously with the climbing attitude the aircraft banks, say to the right, the miniature airplane 9 also banks to the right relative to the horizon line 6, this condition being illustrated in Fig. 3 of the drawing.

On the other hand, should the aircraft assume a diving attitude, the miniature airplane 9 moves below the horizon line 6, thereby indicating a dive. If, simultaneously with the dive, the aircraft should bank, say to the left, the miniature airplane 9 also banks to the left, this condition being illustrated in Fig. 4 of the drawing.

Thus it will be seen that I have provided an aircraft attitude indicating instrument in which the movements of the indicator bear the same relationship to a horizon line 6 of the instrument case as the aircraft bears to the natural horizon. With this type of indication, it is much easier for the pilot to control the aircraft during flying operations, since the illusion is created that he is observing the motion of his aircraft from a stabilized platform in space. Thus, if the pilot observes the miniature airplane banking, say to the right, he instinctively applies left aileron control to level the wings of the miniature airplane with reference to the horizon line 6. If the miniature airplane is seen to dive below the horizon line, the pilot instinctively pulls back on the stick to raise the nose of the aircraft, and thereby restore the miniature airplane to a position in which the wings are in coincidence with the horizon line. Again, if the miniature airplane rises above the horizon line, the pilot instinctively pushes forward on the stick to lower the nose of the aircraft and thereby restore the miniature airplane to the level flight position. It is evident, therefore, with this type of indication blind flying operations are greatly facilitated. It should be noted that the correct sense of indication as described above is obtained without the use of any complicated motion-reversing linkages or gearing so that there is a minimum of friction tending to displace the gyro from the true vertical position.

While I have illustrated an arrangement in which a gyroscope is used to measure angular deviations of the aircraft about the vertical axis, it should be clearly understood that my invention is applicable to instruments using other types of position-maintaining means. Thus, for example, in place of the vertical axis gyroscope a universally mounted pendulum might be used to measure the pitch and bank attitudes of the aircraft.

While I have shown and described particular embodiments of my invention, it will occur to those skilled in the art that various changes and modifications may be made without departing from my invention, and I therefore aim in the claim to cover all such changes and [modificati]ons as fall within the true spirit and [scope of] my invention.

I claim as new and desire to secure by [Letters] Patent of the United States is:

A gyroscopic attitude indicating device for aircraft comprising a casing, a gyroscope universally mounted in said casing so as to be free to rotate about pitch and roll axes, a supporting member mechanically connected to said gyroscope so as to move vertically relative to said casing in response to movement of said casing about said pitch axis, an electrical position-transmitting system comprising transmitter and receiver units, each of said units comprising a stationary annular stator core mounted on said casing having winding means thereon with polyphase connections and a rotor comprising a poled permanent magnet rotatable within said core, means for coupling the rotor magnet of said transmitter unit to said gyroscope so that it rotates relative to its associated stator in response to movement of said casing about said roll axis, means for rotatably mounting the rotor magnet of said receiver unit on said supporting member, the polyphase stator winding connections of said transmitter and receiver units being interconnected so that an angular displacement of the transmitter magnet causes a corresponding angular displacement of said receiver magnet, an indicator mechanically coupled to said receiver magnet and a stationary horizon reference line adjacent said indicator whereby the pitch and bank attitudes of said aircraft are indicated by the vertical displacement and rotation of said indicator relative to said horizon line the connections between the windings of said transmitter and receiver units being selected so that said indicator rotates relative to said stationary horizon line in the same sense that said aircraft rotates about said roll axis relative to the natural horizon.

HARRY C. WENDT.

REFERENCES CITED

The following references are of record in the file of this patent:

UNITED STATES PATENTS

| Number | Name | Date |
|---|---|---|
| 2,038,531 | Bassett et al. | Apr. 28, 1936 |
| 2,080,490 | Kollsman | May 18, 1937 |
| 2,160,970 | Koster | June 6, 1939 |